United States Patent [19]

Huang

[11] 4,069,593
[45] Jan. 24, 1978

[54] SOLAR CURING AND DRYING STRUCTURE AND METHOD OF UTILIZING SOLAR ENERGY ASSOCIATED WITH AVAILABLE SOLAR RADIATION IN CURING AND DRYING VARIOUS MATERIALS

[76] Inventor: Barney K. Huang, 2008 Varnell Ave., Raleigh, N.C. 27612

[21] Appl. No.: 693,378

[22] Filed: June 7, 1976

[51] Int. Cl.² ............................................. F26B 19/00
[52] U.S. Cl. ......................................... 34/93; 34/210; 34/218; 126/270; 237/1 A
[58] Field of Search ................... 34/93, 131, 210, 218, 34/219, 233; 98/31, 32; 126/270, 271, 400; 237/1 A; 47/17, 59

[56] References Cited

U.S. PATENT DOCUMENTS

| 430,762 | 6/1890 | Taylor | 34/93 |
| 3,231,986 | 2/1966 | Touton | 34/93 |
| 3,946,720 | 3/1976 | Keyes et al. | 126/270 |
| 3,952,947 | 4/1976 | Saunders | 126/400 |

Primary Examiner—Kenneth W. Sprague
Assistant Examiner—James C. Yeung
Attorney, Agent, or Firm—Larry L. Coats

[57] ABSTRACT

The present invention relates to a greenhouse curing and drying structure adapted to collect energy associated with available solar radiation and to utilize the heat associated therewith in curing and drying material within said greenhouse curing and drying structure. Basically the curing and drying structure comprises an outer transparent housing and an interiorly disposed solar energy collector housing defining a drying area or chamber thereunder. During phases of curing and drying material in the drying area or drying chamber, an outside air system is directed between said outer transparent housing and said collector housing where solar energy in the form of heat collected is transferred to the passing air system. The solar heated air system may, depending on the temperature conditions within the drying structure relative to the desired drying schedule, be directed to an air intake of a furnace system associated with said curing and drying structure or routed through an energy storage facility where the energy associated therewith may be stored for subsequent use.

10 Claims, 11 Drawing Figures

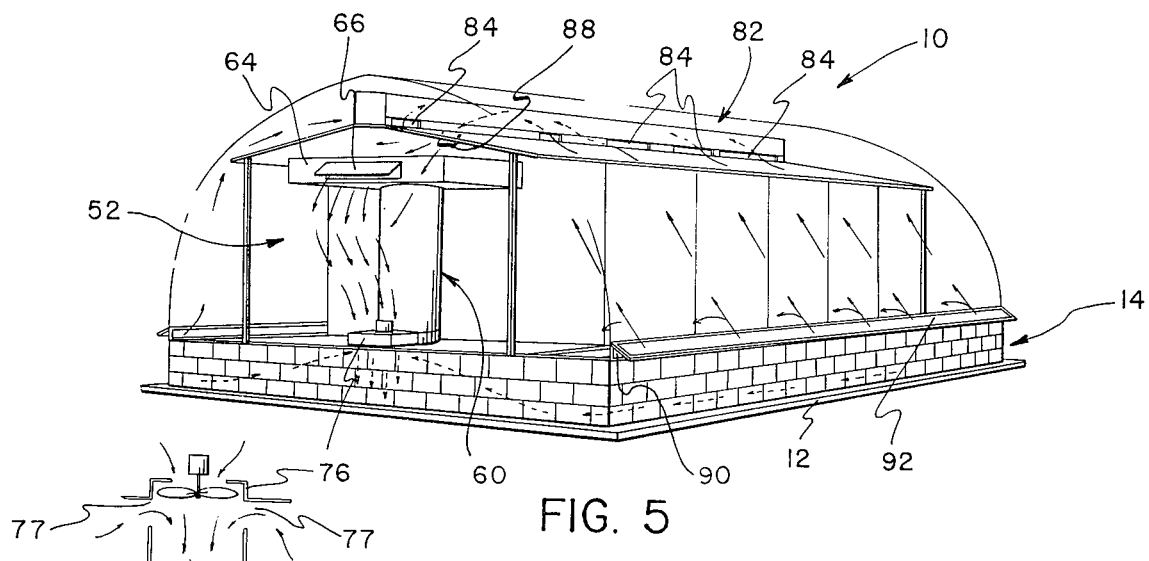
FIG. 5
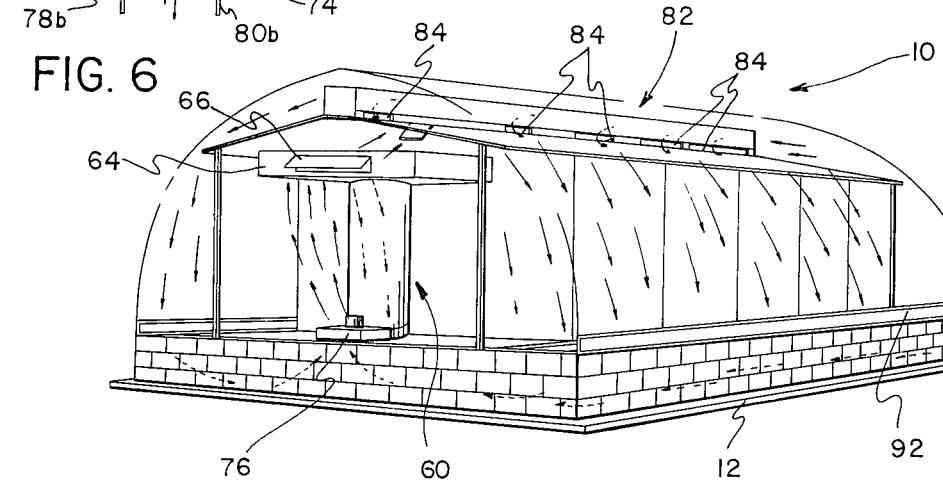
FIG. 6
FIG. 7
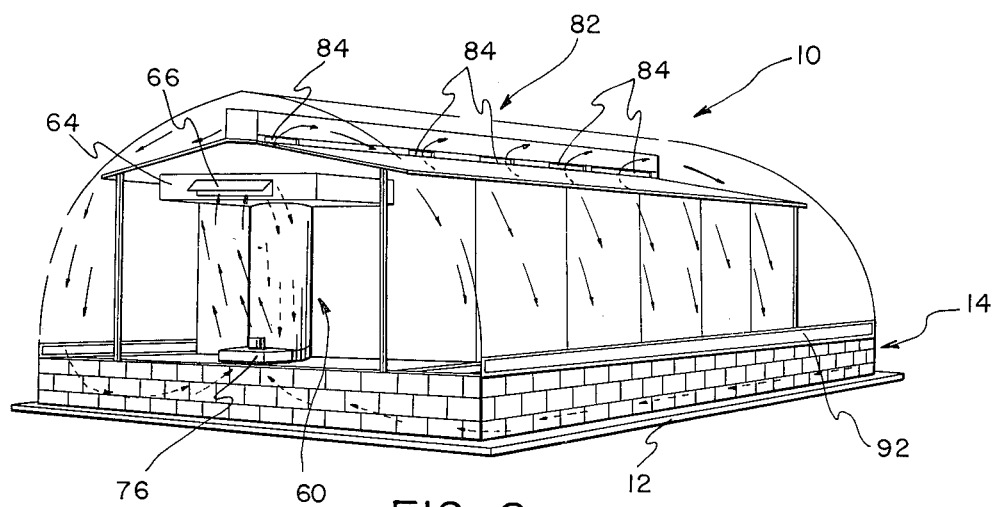
FIG. 8

SOLAR CURING AND DRYING STRUCTURE AND METHOD OF UTILIZING SOLAR ENERGY ASSOCIATED WITH AVAILABLE SOLAR RADIATION IN CURING AND DRYING VARIOUS MATERIALS

Relative to the method of curing and drying material as disclosed herein, the present invention makes use of the entire curing and drying structure as a condenser during certain phases of nighttime curing and drying. In such cases, moisture laden air leaving the drying chamber is directed against said transparent housing where the moistened air contacts the relative cool inner surface of said transparent outer structural housing, resulting in a dehydration effect on the moistened air and consequently causing moisture to be condensed from the air after which the same air, or portions thereof, may be recycled through the curing and drying structure and efficient residual heat use made thereof.

The present invention relates to curing and drying structures and methods of curing and drying material of all types, including agricultural crop materials such as fruits, vegetables and particularly tobacco. More specifically, the present invention relates to a greenhouse solar curing and drying structure adapted to capture and collect solar energy in the form of heat from available solar radiation and to utilize a substantial portion of the collected solar energy during the curing and drying operation performed by said curing and drying structure.

BACKGROUND OF THE INVENTION

Much attention today is being directed at new or previously unused sources of energy as well as the conservation and more efficient use of our present energy sources. In the area of new or previously unused energy sources, solar energy has and is presently one energy source where much research and development is being directed.

Applications of solar energy in agriculture have been suggested and in fact actually placed in practice. The Inventor of the present invention, Dr. B. K. Huang, devised what has been referred to as a "Greenhouse-Bulk Tobacco Curing Barn", the structure thereof being fully disclosed and described in U.S. Pat. No. 3,866,334. Dr. Huang's greenhouse-bulk curing tobacco barn, as disclosed in the above-referred to patent, was basically directed to use by tobacco farmers as both a greenhouse and a curing and drying structure. In the greenhouse embodiment, the farmer can grow his tobacco seedlings or horticultural crops under controlled environmental conditions, and where transplanting is appropriate and desired plants or seedlings are taken from the structure and transplanted in the fields. During tobacco harvesting, the structure is converted for use as a curing and drying structure for curing and/or drying the harvested leaves.

Briefly reviewing the basic curing and drying embodiment of the Huang greenhouse-bulk tobacco barn, as disclosed in U.S. Pat. No. 3,866,334, it is noted that the same comprises a transparent outer housing structure and disposed interiorly thereof is a black plastic-like heat absorber that defines a curing and drying area thereunder. In this Huang solar curing and drying structure, the design calls for a relatively dead air space between the outer transparent walls and the inner disposed heat absorber, and as such, solar energy utilization results from heat energy being collected and absorbed by the inner heat absorber and being transferred directly inwardly to the drying area and the forced air passing therethrough.

SUMMARY OF THE INVENTION

In an effort to maximize and improve curing and drying efficiency and solar energy utilization in a curing and drying structure, the present invention presents a solar curing and drying structure employing a solar heat absorbing air system that may be immediately used in curing and drying material within the curing and drying structure, or the heat associated with said solar heat absorbing air system may be stored within a heat storage facility associated with the curing and drying structure for subsequent use during any desired phase of curing and drying the particular material within the curing and drying structure.

Basically the curing and drying structure of the present invention comprises an outer transparent housing structure and an interiorly disposed heat collector housing or means that defines a solar energy collecting area between said outer transparent housing and said collector housing or means. Defined interiorly of the collector means is a curing and drying chamber or area which is adapted to support the material being cured and/or dried within the structure. As in conventional curing and drying structures, the solar energy curing and drying structure of the present invention is provided with a main furnace system of the forced air type that is adapted to circulate a system of air in and through the curing and drying chamber and to heat the air as necessary to maintain an appropriate temperature level within the curing and drying area within the heat collector housing.

Openings are provided along the lower outer sides of the solar curing and drying structure in order that outside air may be selectively induced into the solar energy collecting area defined between the transparent outer wall of the structure and the interiorly disposed heat collector means. In the embodiment shown herein, the curing and drying structure is provided with a main air transfer duct extending longitudinally within the curing and drying structure and located centrally thereof between the outer transparent housing and the collector means.

To immediately utilize collected solar energy, the curing and drying structure of the present invention allows outside air to be induced into the lower side openings of the curing and drying structure, through the solar energy collecting area defined between the outer transparent walls and the collector means where heat resulting from collected solar energy is transferred to the system of air passing therethrough, and wherein the same system of air is directed through the main air transfer duct via openings provided therein and directed back to the main furnace system where the system of air is received by the main furnace system or other appropriate air handling means and directed into the curing and drying area where the same is utilized to cure and dry material within curing and drying structure.

Where conditions dictate, the solar heat collected may be stored in a storage facility such as a rock and/or gravel embedment provided with the same curing and drying structure. In such case, outside air is directed into the main air transfer duct and generally downwardly and uniformly across the entire heat collector means where heat absorbed by the collector means is transferred to the air system after which the same air is directed through the storage facility which effectively transfers the heat from the air system to the storage facility.

In addition, to improve and maximize the efficient use of energy in various curing and drying phases, the curing and drying structure of the present invention is provided with a secondary air handling system that is adapted to work in conjunction with or independently of the main furnace system during periods of curing and drying or greenhouse operation.

As will become apparent from a thorough and complete reading of the present disclosure, the solar curing and drying structure disclosed herein presents a very versatile curing and drying structure that is particularly adapted to cure and dry various crop materials according to an appropriate curing and drying schedule with a minimum amount of energy used in the total process.

It is, therefore, an object of the present invention to provide a curing and drying structure and method of curing and drying materials that minimizes or reduces conventional fuel consumption and/or electricity used in the curing and drying process.

Another object of the present invention resides in the provision of a solar curing and drying structure that improves the efficiency of solar energy utilization in curing and drying various materials such as tobacco, and other agricultural crops and materials with the curing and drying structure.

Still a further object of the present invention is to provide a curing and drying structure that has the capability to store solar energy collected during phases of curing and drying where internal temperature conditions with respect to the curing and drying process during a phase so dictate.

A further object of the present invention is to provide a curing and drying structure with a secondary air handling and control system that may operate in conjunction with or independently of a main furnace system, and wherein a fan forming a part of said handling system and associated with said curing and drying structure acts to more efficiently move air through the curing and drying area during certain phases of the curing and drying process, or acts to effectuate solar energy storage during periods of the curing and drying process where the collected solar energy is not immediately needed for the curing and drying purposes.

Still a further object of the present invention is to provide a method of curing and drying materials such as tobacco or other agricultural crops where during nighttime drying periods the entire curing and drying structure is utilized as a heat exchanger and moisture laden air leaving said drying area is directed against the relatively cool inner surface of said outer housing structure of said curing and drying structure, resulting in dehydration or moisture removal from the air, after which the same air or portions thereof may be rerouted through the curing and drying structure such that at least portions of the energy formerly associated therewith is retained and utilized again in the curing and drying process.

It is also an object of the present invention to provide an improved solar curing and drying structure that may also be utilized as a greenhouse for growing plants and wherein there is provided an energy storage facility for storing excessive solar heat during daytime periods and consequently by the act of storing excessive heat, cooling and lowering the temperature within the greenhouse during the daytime periods. Also, this object entails the provision of a greenhouse in which the stored energy may be utilized at nighttime periods within the greenhouse to contribute to a generally uniform daily temperature.

It is also an object of the present invention to provide plenum space for water storage to be used for hydroponic culture and extra solar energy storage.

Other objects and advantages of the present invention will become apparent from a study of the following description of the accompanying drawings which are merely illustrative of the present invention.

BRIEF DESCRIPTION OF THE DRAWINGS

FIGS. 4, 5 and 7 through 9 are a series of generally schematic perspective views of the greenhouse solar curing and drying structure illustrating various air flow patterns that may be used during certain phases of a curing and drying process or during a greenhouse operation.

FIG. 6 is a schematic view of a secondary air handling system that includes a reversible fan wherein in FIG. 6 there is illustrated the use of the fan to induce outside air through the energy storage facility associated with the greenhouse solar curing and drying structure by the use of a venturi effect while still inducing air through the solar energy collection area defined between the heat absorber and the outer structural housing where the same air is continued to be circulated through the curing and drying structure.

GREENHOUSE SOLAR CURING AND DRYING STRUCTURE

Figure 1:
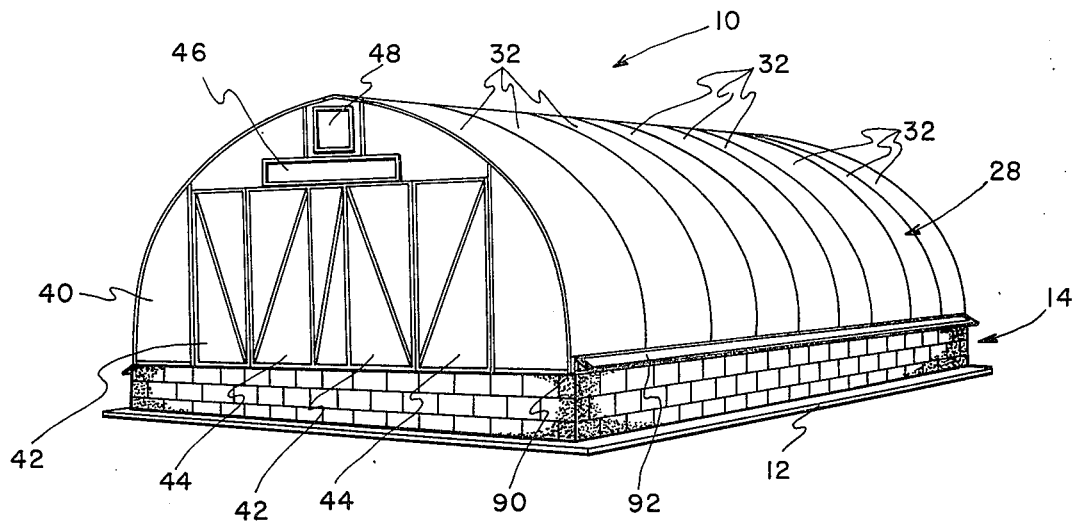
FIG. 1 is a perspective view of the greenhouse solar curing and drying structure of the present invention.
Figure 2:
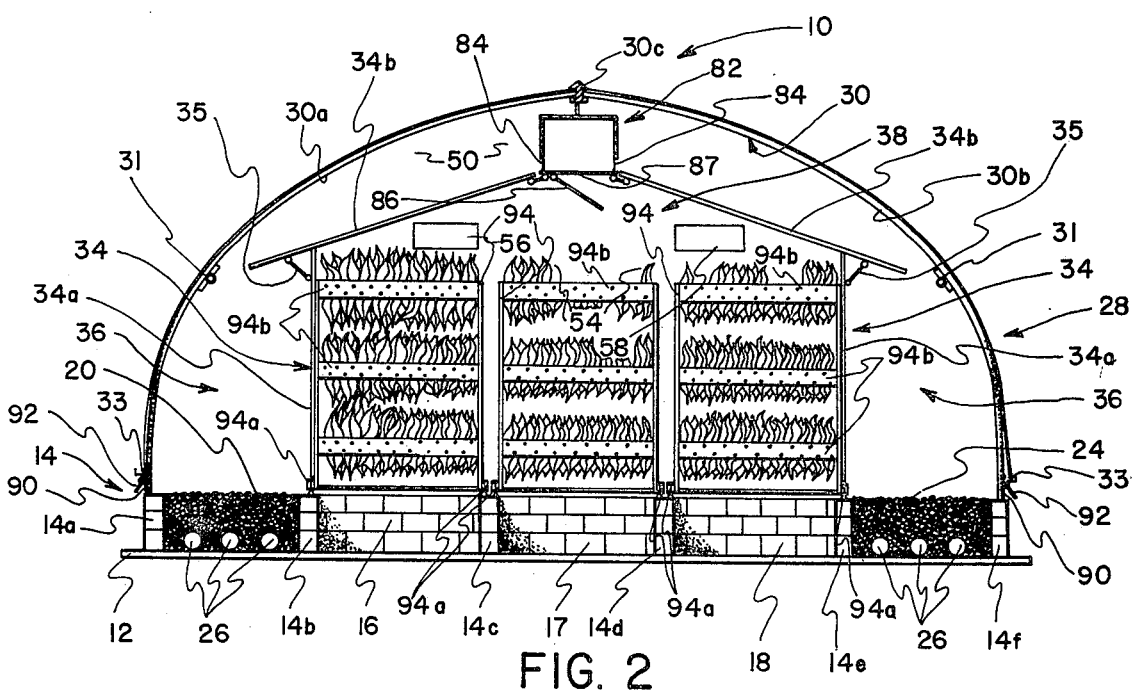
FIG. 2 is a cross sectional view of the greenhouse solar curing and drying structure wherein the same is provided with a three bay inner drying area or chamber in the embodiment shown the same is provided with a series of container or box type tobacco racks.
Figure 3:
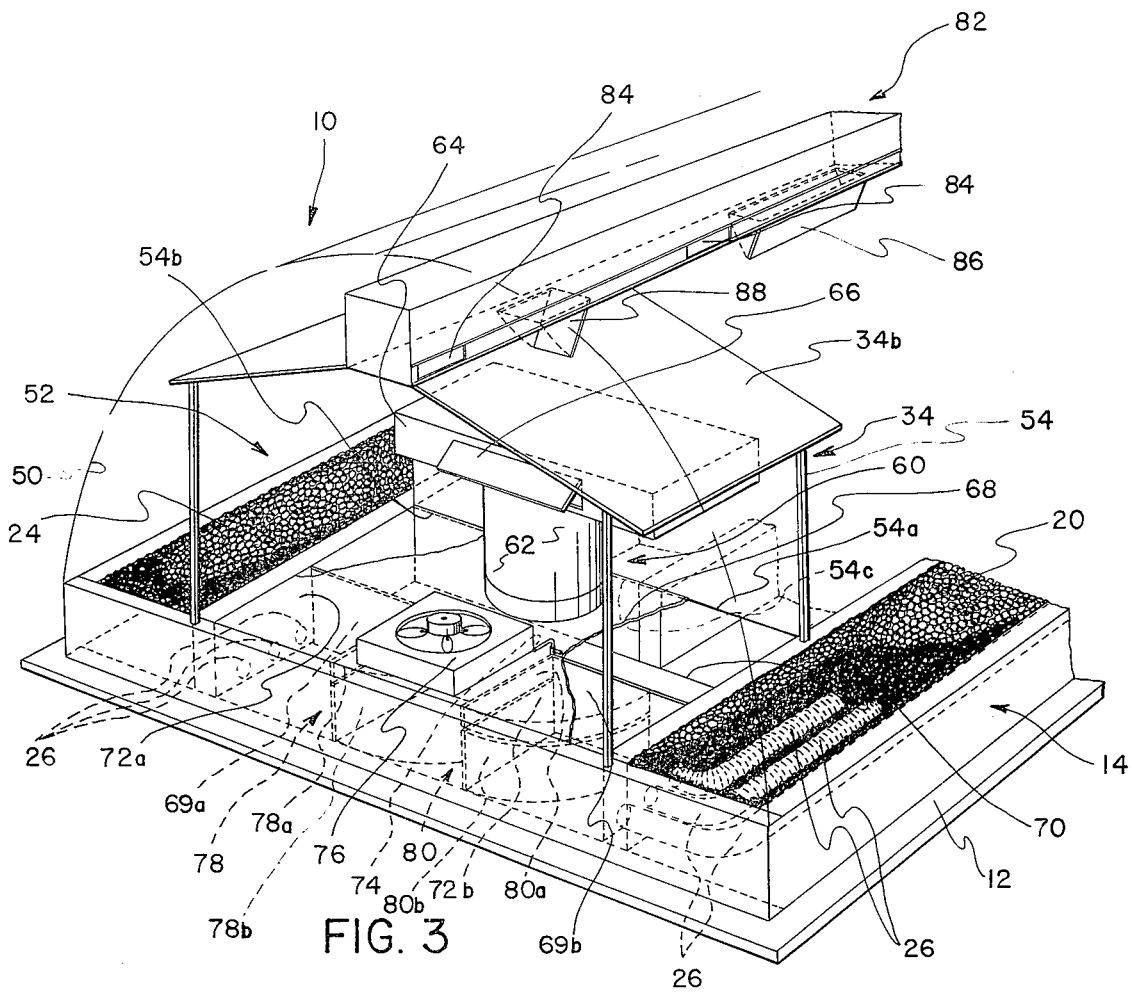
FIG. 3 is a fragmentary perspective view of the rear portion of the greenhouse solar curing and drying structure, particularly illustrating the rear furnace room, main furnace, and secondary air handling system.

With further reference to the drawings, particularly FIGS. 1-3, the solar curing and drying structure of the present invention is shown therein and indicated generally by the numeral 10. Although the solar curing and drying structure 10 may be used to dry various types of material, such as agricultural crops including fruits, vegetables and wood products, in the present disclosure the structure will be described generally in conjunction with bulk curing and drying flue-cured tobacco. But it should be noted that as a curing and drying structure, the solar curing and drying structure 10 of the present invention may be adapted to cure and dry many types of material that require moisture removal within a certain stage or phase of processing.

Viewing the solar curing and drying structure 10 in greater detail, it is seen that the same is supported in the case of embodiment shown by a foundation including a concrete slab 12 that generally lies adjacent the ground, and a concrete block foundation wall, indicated generally by the numeral 14, built up from the concrete slab and adapted to support the main structural housing components of the curing and drying structure 10. Forming a part of the block foundation wall 14 is a series of longitudinally extending block walls 14a, 14b, 14c, 14d, 14e and 14f. As viewed in FIG. 2, defined between block walls 14b and 14c, 14c and 14d, 14d and 14e are a series of plenums 16, 17, and 18, respectively. It is understood that the number of plenums within the curing and drying structure 10 can be increased or decreased depending on the desired width of the plenum or plenums and the overall width of the curing and drying structure 10.

Solar curing and drying structure 10 of the present invention is provided with an energy storage facility about each outer side wall thereof just above the level of the concrete slab 12. More particularly, this energy storage facility is provided in the form of a pair of gravel or rock beds 20 and 24, each gravel or rock bed being confined between a pair of outside foundation walls 14a and 14b and 14e and 14f. Although various forms of material may be used within the energy storage bed areas defined between the particular block walls, the present disclosure contemplates the use of crushed granite or similar type rock, gravel or stone, or any other material with high thermal capacitance, in which the material is placed between the respective foundation walls and extends substantially the entire length of the curing and drying structure along the lower outer side walls thereof. Disposed within each gravel or rock bed 20 or 24 is a series of laterally spaced perforated ducts 26 that extend substantially the full length of the gravel or rock beds 20 and 24 and as will become apparent from subsequent portions of the present disclosure, these perforated pipes act to channel or convey air during certain phases of curing and drying or greenhouse environmental conditioning to the rear of the curing and drying structure 10 wherein certain air handling and control means is utilized to store or extract heat relative the respective gravel and rock beds 20 and 24.

Turing to a discussion of the main structure components of the curing and drying structure 10, it is seen that the same includes an outer structural housing 28 that is of a generally Quonset shape as the structure extends over and between the outer foundation walls 14a and 14f comprising the block foundation 14 of the present structure. The outer structural housing 28 includes a series of bow rafter assemblies 30 wherein respective lower remote ends are secured or otherwise embedded into the outer block walls 14a and 14f and extend in generally arcuate fashion over the underlying concrete slab 12 and block foundation 14. As particularly illustrated in the drawings, the bow rafter assemblies extend transversely across the curing and drying structure and are longitudinally spaced so as to accommodate a series of transparent materials or fiberglass panels 32 that are in conventional manner secured to the outer areas of the bow rafter assemblies 30 and are generally curved during construction and assembly such that the fiberglass panels 32 conform to the shape of the bow rafter assemblies. Details of the Quonset shape fiberglass outer housing structure 28 are not dealt with herein in detail, as such construction is known and it not per se material to the present invention. But it might be noted that a preferable construction design would call for each complete bow rafter assembly 30 to include left and right-hand half bow rafters 30a and 30b (FIG. 2) with the same two being coupled together about an upper central longitudinal line of the structure 10 by a coupling member 30c adapted to receive respective upper inner ends. In addition the bow rafter assembly 30 of the outer structural housing may be supported by one or more longitudinal purline members 31 secured to each respective bow rafter assembly 30 about the inner side thereof.

Disposed interiorly of the outer structural housing 28 is a heat collector housing or means 34 that is preferably removable from the structure 10, the heat collector housing or means 34 extending substantially the entire length of the curing and drying structure 10 or at least the length of a drying area or drying chamber 38 defined thereunder. Therefore, as viewed in FIG. 2, the area interiorly of the heat collector housing 34 is referred to as a drying area or chamber since this is the area which is occupied by the material being cured and dried by the structure. The space exteriorly of the heat collector housing 34 or the space between the outer structural housing 28 and the heat collector housing 34 is referred to as a solar energy collecting area 36.

With respect to the heat collector housing 34, it should be pointed out that the same can be constructed of various types and weights of material, but to maximize the solar energy collecting efficiency thereof, the outer surface should be thermally black or painted black. In addition, the heat collector housing 34 that basically defines the drying area chamber 38 interiorly thereof can be designed to be self-standing or self-supporting. The vertical sides forming a part of the collector housing 34 as illustrated in FIG. 2 (denoted as 34a), can be integrally constructed with either a box type container or a portable frame assembly such as disclosed in FIGS. 6 and 7 of U.S. Pat. No. 3,866,334, the complete contents thereof being expressly incorporated herein by reference. It will be appreciated in cases where the vertical sides 34a of the heat collector housing 34 are integrally constructed with these types of structures that it would be necessary that the upper portion 34b of the collector housing 34 be capable of being separated from the vertical side portions 34a thereof by a latching mechanism such as a conventional elastomember 35.

Disposed across the front portion of the solar curing and drying structure 10 is a front end wall 40 that is comprised of a basic frame structure extending transversely across the front of the structure generally adjacent the forwardmost bow rafter assembly 30 (FIG. 1). Secured to the frame structure of the front end wall 40 is a series of fiberglass panels that give rise to a transparent front wall. Centrally located within the front end wall 40 is a pair of double door sets, each double door set including left and right-hand doors 42 and 44. Disposed above the double door sets is an exhaust louver 46 which when opened allows air to exhaust from said drying area or chamber 38 defined interiorly of said heat collector housing or means 34. Formed above the exhaust louver 46 is a front air inlet door or panel 48 which is disposed generally above the plane of the heat collector housing 34 and as will be pointed out in more detail in subsequent portions of the disclosure, this front air inlet 48 when opened allows air to enter the front portion of a main longitudinal air duct assembly.

The rear of the solar curing and drying structure 10 is provided with a divider wall 54 that extends substantially transversely between the vertical side members 34a of the heat collector housing 34 and generally encloses the drying area or chamber 38 from a rearwardly disposed furnace room 52 (FIG. 3) that is defined between a rear end transverse wall 50 of the structure 10 and the rear divider wall 54. It should be pointed out at this point that to maximize the collection of solar energy, that the heat collector housing 34 preferably extends the entire length of the structure, i.e., from the front end wall 40 to the rear end wall 50. With respect to the rear divider 54, it is seen that the same includes a pair of air return openings 56 and 58 that when opened allows air to return from the drying area of chamber 38 to the furnace upper air return 64.

As in conventional bulk curing systems and particularly illustrated in FIG. 3, the solar curing and drying structure 10 of the present invention is provided with a forced air furnace system indicated generally by the numeral 60, the furnace system being disposed within the furnace room 52 and positioned closely adjacent the rear divider panel 54. Details of the furnace system 60 will not be dealt with herein because such is well appreciated in the art, but briefly referring to the same for the sake of a more unified understanding of the present invention, it is seen that the same includes a main central housing 62 that is provided internally with a burner (not shown) to accommodate either oil or gas. Also, the central housing 62 of the furnace system type disclosed herein includes an electric powered fan (not shown) that is generally disposed above the burner and when actuated is effective to pull a system of air through the central housing 62 and to direct the same downwardly to an underlying furnace plenum area 70 disposed generally below the furnace and opened to the drying area or chamber 38 through openings 54a, 54b, and 54c to the plenum areas 16, 17, and 18 within the drying area or chamber 38.

Continuing to refer to the furnace 60, the same further includes an upper air return assembly 64 that is communicatively connected to air return openings 56 and 58 formed in the divider panel 54. In addition, the upper air return 64 includes an adjustable air intake damper 66 about the rear edge thereof, as viewed in FIG. 3, for allowing air to enter the furnace system from outside of the drying area or chamber 38.

Spaced upwardly from the concrete slab 12 within the furnace room is a furnace room floor 68 constructed of plywood or other suitable material that extends within a generally horizontal plane across the furnace room at a desired level. Between the furnace room floor 68 and the concrete slab 12 there is defined what has previously been referred to as the furnace room plenum 70. At an intermediate point between the rear wall 50 of the structure and the divider panel 54, there extends a pair of vertical divider panels 69a and 69b. These divider panels 69a and 69b define two rear furnace room air duct areas 72a and 72b that lie underneath floor 68 and are communicatively connected with the rear ends of the air channeling pipe 26 that extends longitudinally through the energy storage gravel beds 20 and 24, as best seen in FIG. 3. Disposed between the rear air duct areas 72a and 72b and generally within an opening in the furnace room floor 68 is a reversible power fan assembly 76 that is generally opened to both rear air ducts 72a and 72b. In addition, the rear duct divider panels 69a and 69b terminate inwardly in spaced apart relationship so as to define a central opening 74 to the furnace room plenum area 70. More particularly, the central opening 74 allows air to pass from the rear duct areas 72a and 72b directly into the furnace plenum areas 70 where the same air may be directed into the drying area or chamber 38.

Swingably mounted about the inward edges of the rear duct divider panels 69a and 69b is a pair of double doors or air stop baffles 78 and 80. Each of the double doors includes a top door area 78a and 80a, and a bottom door area 78b and 80b. The respective top and bottom portions of each door may be actuated independently of the other door part, or both top and bottom portions may be moved and actuated simultaneously. Each double door is movable between three basic positions. In a first position, each door is swung to where it lies adjacent one side of a respective rear duct divider panel 69a or 69b. In a second position, each door assumes a posture in which the door extends transversely across the back air ducts 72a and 72b so as to block the movement of air or inhibit the movement of air therethrough. A third position is realized by swinging door 78 (or alternatively door 80) underneath the reversible fan 76 to where the door assumes a position occupied by the central opening 74 to the furnace plenum 70. In this third position, it follows that air is prohibited from moving from the rear air ducts 72a and 72b into the furnace plenum area 70.

Curing and drying structure 10 is provided with a main central air transfer duct 82 that extends substantially the entire length of the structure from the front end wall 40 to generally the rear end wall 50. As seen in the drawings, the front portion of the main air transfer duct 82 is communicatively connected with the front air inlet 48 formed within the front end wall 40. Provided on each side of the main transfer duct 82 is a series of longitudinally spaced side openings 84. Each of the side openings 84 is preferably provided with an adjustable closing panel or the like (not shown) that is movably mounted such that the same may be positioned to close each of the entire side openings associated therewith or move to an opened position for allowing air to move freely between the solar energy collecting areas 36 and the main air transfer duct 82. During the basic operation of the curing and drying structure 10, it is desirable to maintain a generally uniform flow of air over substantially the entire collecting area of the heat collector housing 34. Because of pressure differentials along the longitudinal axis of the main transfer duct 82, it is preferable that the side openings 84 be progressively smaller from the front of the duct towards the end where the furnace system 60 is located because the pressure differential within the main duct 82 would generally vary accordingly due to the position of the furnace 60. By providing the side openings such that the area thereof generally increases from the rear of the structure towards the front, it is appreciated that this should compensate for the pressure differential and give rise to a more uniform flow of air through the solar energy absorbing area 36 and over the solar energy collecting housing 34.

As particularly illustrated in FIG. 3, the rear portion of the main air transfer duct 82 extends through the drying room or chamber divider panel 54 and actually extends into the furnace room 52 at a position generally overlying the furnace system 60. In order to allow the air to move between the main transfer duct 82 and the furnace room 52, the rear end of the main duct 82 is provided with a rear duct gate or duct to furnace room door 88 that can be opened or closed depending on the particular total air flow pattern system desired for that particular drying phase.

A further part of the total air control system as it relates to the curing and drying structure 10 of the present invention, is the provision of side openings 90 formed in the lower side area of the outer structural housing 28. In conjunction with each side opening 90, there is provided a closing panel 92 that may be manually or automatically actuated to open and close the side openings 90 in accordance with a desired air flow pattern during a curing and drying process.

As stated hereinbefore, the curing and drying structure 10 of the present invention can be used to dry various types of material, both agricultural products and nonagricultural products. In the embodiment shown, the flue-cured tobacco within the structure 10 is disposed in what is now being referred to as portable frames 94 such as disclosed in U.S. Pat. No. 3,866,334 to B. K. Huang which is herein incorporated by reference. Portable frames 94 include rollers 94a that enable them to be rolled in and out of the structure 10, and each portable frame 94 is adapted to support a plurality of conventional single tier racks 94b. Preferably sufficient numbers of portable frames 94 are provided such that individual frames are placed back-to-back in longitudinal alignment above respective plenums 16, 17 and 18. In the embodiment shown in FIG. 2, certain portable frames 94 are provided with sides 34a that form the vertical side of the heat collector housing 34. Alternatively, structure 10 of the present invention could also accommodate conventional containers or box type racks such as those disclosed in U.S. Pat. No. 3,948,533 to Charles W. Suggs, this patent being expressly incorporated herein by reference.

METHOD OF CURING AND DRYING FLUECURED TOBACCO OR OTHER MATERIAL WITHIN THE SOLAR CURING AND DRYING STRUCTURE

It should be emphasized that first and foremost the present invention presents a curing and drying structure that is principally designed to efficiently and economically collect and utilize solar energy in a curing and/or drying process. The present invention and disclosure, however, goes beyond just the basic teachings of solar energy collection and utilization in a curing and drying process. With the provision of the main air duct 82, the energy storage facilities 20 and 24, the auxiliary or secondary fan 76, and other related air flow control means, various air flow patterns may be achieved within the curing and drying structure 10 in which any one air flow pattern through the structure 10 is intended to minimize and conserve energy while maintaining environmental conditions within the drying area or chamber 38 relative to the material being cured and/or dried and the acceptable drying schedule or curves generally prescribed for that material. To illustrate the various basic air flow patterns and to present particular methods of curing and drying flue-cured tobacco which form a part of the present invention, the following discussion will deal with curing and drying tobacco according to generally accepted flue-cured tobacco curing and drying principles.

Before proceeding with this discussion, in the way of background, curing and drying of flue-cured tobacco has traditionally involved three phases: (1) yellowing, (2) drying, and (3) stem drying (also referred to as "killing out"). Yellowing is always the first phase and is generally accomplished by subjecting the tobacco to a temperature of 90° to 110° Fahrenheit for a period of time ranging generally from 48 to 72 hours. Leaf drying, phase 2, follows the yellowing phase and is particularly characterized by slowly increasing the temperature within the curing and drying chamber, normally about 1° to 2° Fahrenheit per hour and generally through a temperature range of 110° to 135° Fahrenheit. Finally, after leaf drying, the stem drying or killing out phase is begun. Again, the temperature is slowly increased about 2° to 3° Fahrenheit per hour until the temperature reaches approximately 170° Fahrenheit at which point the curing and drying operation is normally completed. This is a general summation of the basic flue-cured tobacco curing and drying schedule as presently practiced. But it should be pointed out that curing and drying procedures for tobacco may vary for different primings and different maturity levels, and even may vary from farmer to farmer to some extent.

To illustrate the various basic air flow patterns and to present particular methods of curing and drying certain phases for flue-cured tobacco which form a part of the present invention, the following discussion will deal with curing and drying tobacco according to accepted flue-cured tobacco curing and drying practices now being used in bulk curing.

Figure 4:
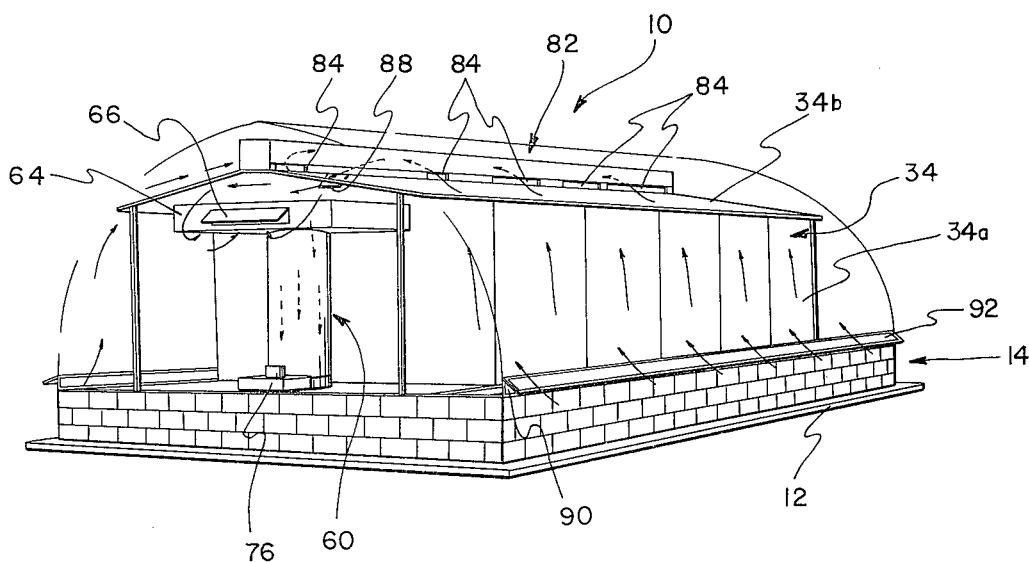

Beginning this discussion with daytime drying, including leaf drying or stem drying of the tobacco, the various air flow control points of the curing and drying structure 10 are set to correct solar energy and to immediately use that energy collected in the drying process. With particular reference to FIG. 4, in this basic drying phase in which the solar energy is collected and immediately used, the main furnace system 60 is operating to force a system of air through the furnace downwardly to the furnace plenum 70 and into the lower plenum areas 16, 17, and 18 of the curing area or chamber 38. The furnace during this time is controlled so as to heat the passing air as necessary to maintain a certain temperature level within the curing and drying chamber 38. Once the system of air is forced underneath the drying material within the chamber 38, the same system of air is forced upwardly through the material or tobacco leaves and as the air moves through the leaves a drying effect is realized with respect to the material within the curing area or chamber 38. After moving vertically through the material, a portion of the drying air may be exhausted out of the front exhaust louver 46, while the remaining portion of the drying system of air is returned to the furnace through the air return openings 56 and 58 formed within the divider panel 54.

Still with respect to FIG. 4 and basic daytime drying, solar energy is collected and utilized to supplement the heat of the main furnace system 60 in the drying process. In this regard, the side panels 92 formed within the side portions of the outer structure housing 28 are in a selected or controlled opened position allowing air to be induced therethrough into the solar energy collecting area 36 formed on each side of the structure 10. Outside air is continuously pulled through openings 90 and up along and adjacent the heat collector housing 34 and into the side openings 84 within the main air transfer duct 82. The system of air moving within the solar energy collecting area 36 tends to be generally uniformly distributed over the entire surface area of the heat collecting housing or means 34 due to the spacing and size of openings 84. After passing over the top portions 34b of the heat collecting housing 34 the air is induced into the main central transfer duct 82 and because the inlet opening 48 and the bottom openings 86 are closed, the air once within the main transfer duct 82 is required to move generally rearwardly within the main duct and as such the air exits through the opened rear duct to furnace room gate or door 88 and the air consequently exits into the furnace room 52 where the same can be directed into the air intake 66 of the upper air return 64 and combined with the main system of drying air that is being circulated to and from between the furnace system 60 and the curing and drying chamber 38.

Therefore, it is seen that by pulling in outside air into the solar energy collecting area 36 between the fiberglass panels 32 and the collecting housing 34 in a generally uniform air flow pattern over substantially the entire area of the heat collecting housing 34, that a substantial amount of solar energy in the form of heat is transferred to the passing air and ultimately introduced into the system of drying air during daytime drying, as particularly viewed in the air flow pattern illustration incorporated into FIG. 4.

Now with reference to FIG. 5, the drawing therein illustrates a second basic air flow pattern within the structure 10 where a portion of the collected solar energy is used immediately for curing and/or drying, and the remaining portion is stored during the daytime within the energy storage facilities 20 and 24 provided with the structure 10. Also, in conjunction with this illustration air flow pattern, the main furnace system 60 may be placed in an inoperative mode and the auxiliary or secondary fan 76 is operating to cause air to flow from the upper air return 64 of the main furnace system 60 downwardly therethrough where the air is directed through the central opening 74 underlying the forward edge of the secondary fan 76. From the central opening 74 air at a relatively low volumetric flow rate is directed into the plenums 16, 17 and 18 of the curing and drying area or chamber 38 up through the material tobacco therein. After the air has moved through the material within the drying chamber 38, the same is directed back through the structure where the air exits from the curing and drying chamber through the return openings 56 and 58 formed within the rear divider panel wall 54.

As noted above, the particular curing and/or drying phase being illustrated here makes use of a portion of the solar energy collected during the daytime, while storing a portion of the remaining collected solar energy. To accomplish this, the side panels 92 are partially opened in order that air can be induced therethrough into the solar collecting area 36 on each side of the structure 10 where the induced air is split into two air systems, one air system continuing up over the heat collector housing 34 and into the main air duct 82 via the side openings 84, while the other system is directed generally downwardly through the respective gravel storage facilities 20 and 24, and on through the perforated pipes 26 towards the rear of the structure. The system of air passing into the main air duct 82 in the air flow pattern discussed above and shown in FIG. 5, moves to the rear of the main transfer duct 82 and exits into the furnace room 52 where the same can be introduced into the main system of air being circulated through the drying chamber 38 by the reversible secondary fan 76. As far as the storage air system goes, the top portions of the double doors 78a and 80a, as illustrated in FIG. 6, are swung back to the first position adjacent the sides of the rear duct 69a and 69b while the lower portions of the two double doors 78b and 80b extend transversely across the rear air duct areas 72a and 72b. The relatively small side openings 77 (FIG. 6) adjacent the secondary fan 76 caused by the position of the top door portions 78a and 80a of the double doors give rise to a venturi effect causing a portion of the inlet air through the side openings 90 to be pulled and directed through the respective storage facilities 20 and 24. The net effect of this is that the portion of the air pulled through the respective storage facilities 20 and 24 tends to transfer heat associated therewith to the gravel or rock comprising the respective storage facilities.

In the case of the air flow pattern and curing and drying method just described, the rear duct to furnace room door 88 is opened during the daytime.

It should be pointed out with the basic method of curing and drying as illustrated in FIG. 5, that from time to time it might be necessary to fire the main furnace system 60 to maintain a certain desired temperature level within the curing and drying structure. In the case of curing and drying tobacco, the basic methods described above with respect to FIG. 5, would be appropriate in many cases during the stem drying of the fluecured tobacco leaf or sometimes referred to as the "killing out" phase because a relatively low air flow rate can be used and the total electric energy can be conserved significantly by this mode of operation.

Now turning to FIG. 7, an illustration of collecting solar energy and the complete storage thereof during daytime operations in which case a relatively low temperature level is desired within the curing chamber 38, such as yellowing within the curing and drying process for flue-cured tobacco. In the case, the main furnace 60 could be running continuously or intermediately and the secondary fan 76 would also be running. Basically solar energy collected is stored by directing an inlet system of air through the front opening door 48 provided for on the front wall of the curing and drying structure into the main air transfer duct 82. Air entering the main air transfer duct 82 is directed rearwardly therethrough where portions of the air is dispersed from each side thereof through the particularly spaced openings 84 provided in the side thereof. As the air moves from the main air duct 82, the same is directed downwardly generally uniformly over substantially the entire cross sectional area of the heat collecting housing 34 where the same enters a respective side energy storage facility 20 or 24. After entering the energy storage facility, the air being generally preheated by the heat associated therewith is transferred to the gravel or rock within the energy storage facilities. The secondary fan 76 is appropriately driven such that the same pulls the air through the ducts 26 within both energy storage facilities 20 and 24 and it is appreciated that once reaching the area of the fan 76 that the air is cooled because of the transfer of heat therefrom. The cooled air leaving the fan 76 is exhausted into the furnace room 52 where the same may enter the air intake area 66 of the main furnace system 60 thereby combining this air with a main circulating system of air that is being directed between the furnace system 60 or the furnace room 52 and the curing and drying chamber 38. In yellowing tobacco during the daytime, this could have a desired net cooling effect.

With the stored energy within the storage facilities 20 and 24, the curing and drying structure can then utilize the stored energy by passing air again through the storage facilities at night to recapture the energy and to use the same within the curing and drying process. Thus, when properly controlled the structure 10 may be used to very effectively use the collected solar energy.

With respect to FIG. 8, the method of drying suggested therein is particularly adapted for nighttime use during a main drying period. The main drying principle involved with this particular method of curing and drying is that the moisture laden air leaving the material within the curing chamber 38 during drying and during nighttime drying particularly, is directed into the lower opening 87 by the open lower door 86 (FIG. 2) within the main air transfer duct 82 and out the side openings 84 formed in the sides thereof. As the moisture laden air exits the side openings at night, the air engages and contacts the inner surface of the outer fiberglass structural housing 28 which is generally relatively cool in contrast to the temperature of the air. The result is a dehydrating or condensing effect on the air as moisture is generally removed therefrom and tends to run down or escape from the inner sides of the outer structural housing 28 where the water is caught by side gutters 33 and properly routed from the structure 10 (FIG. 2). In some cases, even after this dehydrating effect on the exiting air, it still may be necessary to exhaust a portion thereof through the side openings 90 within the outer structural housing 28. But in many cases the air after being dehydrated, but still higher in temperature than outside air, can be pulled through the energy storage facilities 20 and 24 by the secondary fan 76 and combined with a main drying system of air that is being directed to and from between the drying chamber 38 and the furnace room 52 by the furnace system 60.

Figure 9:
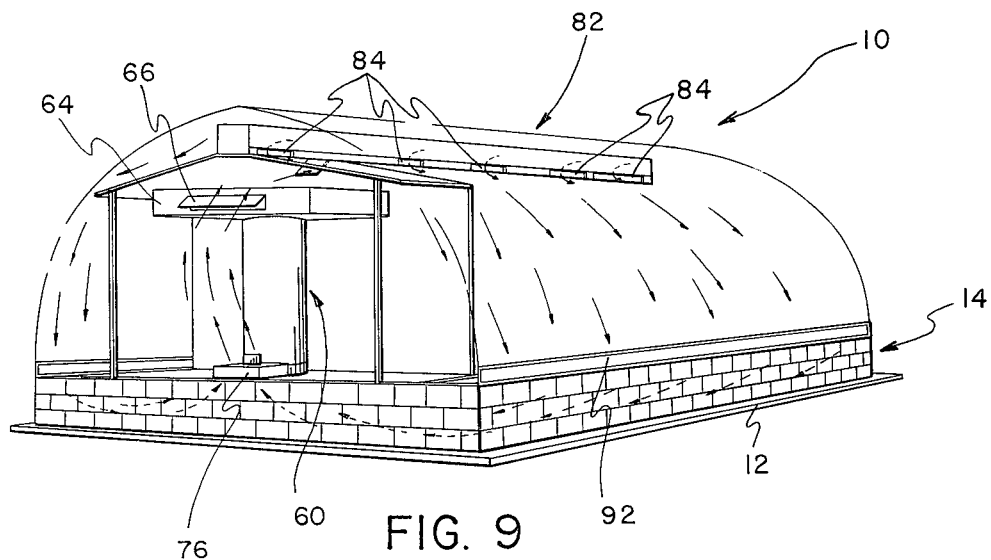

As has already been discussed, the curing and drying structure of the present invention can be converted to a greenhouse by removing the heat collector housing 34 and making other minor adjustments. When used as a greenhouse, the excessive heat due to solar radiation during the daytime can likewise be stored within the storage facilities 20 and 24 and consequently, a cooling effect can be achieved. In addition, at night, by particularly circulating air through the storage facilities 20 and 24, the stored solar energy can be collected and utilized within the greenhouse structure to maintain a certain temperature level and consequently, the need and requirement for heat from the main furnace system 60 is nullified or at least reduced. With particular reference FIG. 9 and the air flow pattern shown therein, it is seen that outside air during the daytime is introduced into the greenhouse structure through the open door 48 formed in the front wall 40 of the structure. Air entering the main air duct 82 through the open door 48 is directed rearwardly through the main air duct 82 and out the side openings 84 formed therein and into the greenhouse area. After entering the relatively hot greenhouse area, heat is transferred to the air and the same air is directed through the heat storage facilities 20 and 24 where the heat from the air is transferred to the storage material, such as gravel and rock therein, and consequently, the air is cooled. The inducement of the air through the heat storage facilities 20 and 24 is caused by the operation of the secondary fan 76 and the air, as indicated in FIG. 9, is pulled upwardly therethrough and directed into the rear end of the main air duct 82 through the duct to furnace room door 88 and this air joins other incoming air to again recirculate through the greenhouse structure as just described. At night the door 48 can be closed so that stored energy can be circulated within the greenhouse for effective space heating. It is appreciated that in this operation, that generally the main furnace system 60 is not normally operative as the desired temperature levels can be maintained generally within the greenhouse structure by the use of the secondary fan 76 alone. But, obviously, if more heat is needed at any time than can be provided by the solar energy collected and/or stored, then the main furnace system can be actuated to deliver such heat. Without belaboring the greenhouse operation, at night the stored heat can be recaptured by simply routing air through the storage facilities 20 and 24 and directing the air into the greenhouse area. Again unless otherwise called for, this can be done by the secondary fan 76.

In the case of conventional greenhouse operations, it is known that in most greenhouse designs that the temperature during certain periods of the year is often too high during daytime and too low at night for maximum crop production within the greenhouse. Therefore, in many greenhouses there is required a cooling system during daytime and a heating system during nighttime. With the solar energy storage facilities 20 and 24 of the present invention, excessive solar energy received during the daytime can be stored and utilized at night, and consequently the net effect is a cooling effect during the daytime and a heating effect at night.

Figure 11:
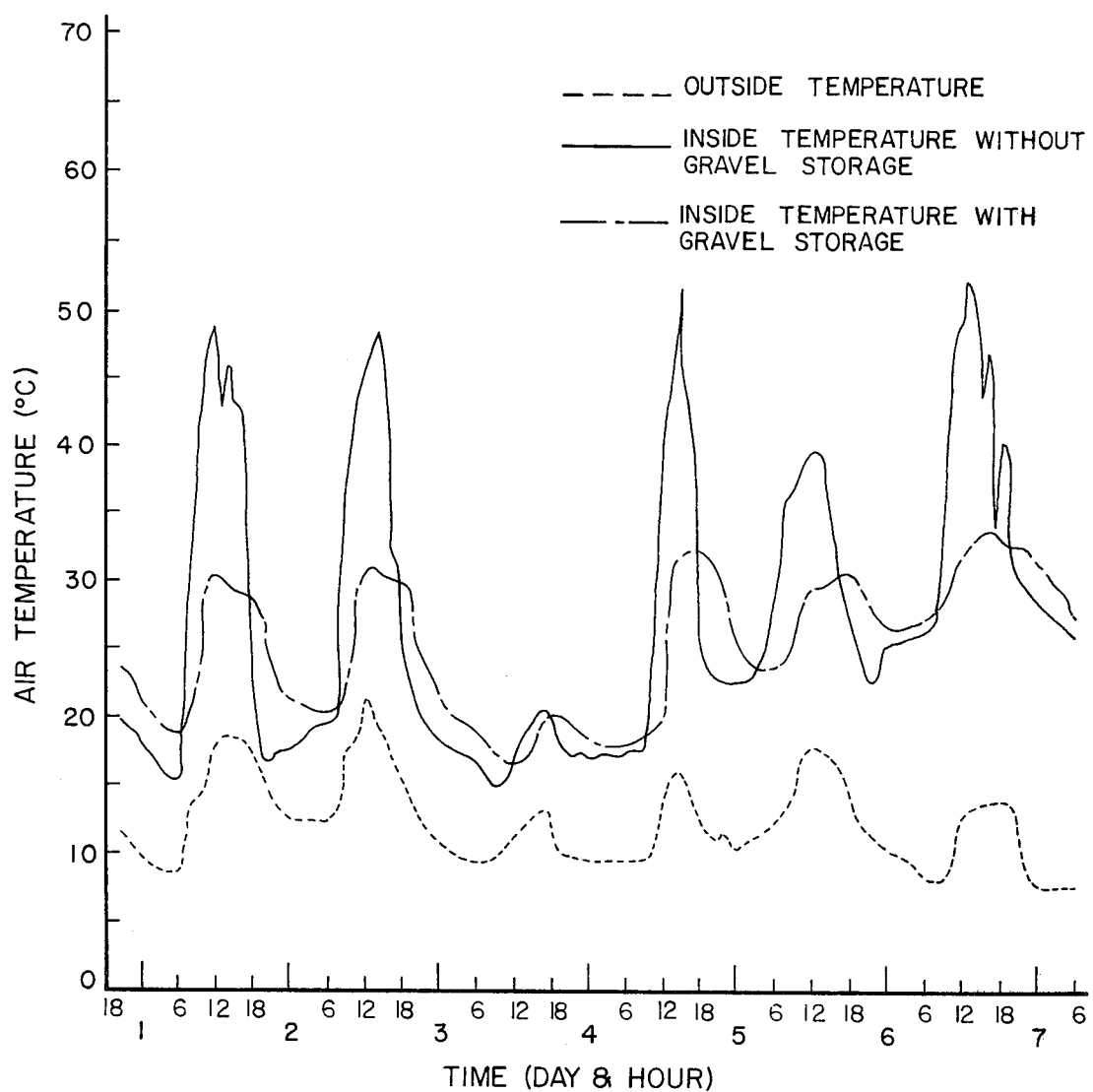
FIG. 11 is a graph representing typical temperature curves over a period of operation time for a greenhouse type operation, each temperature curve representing a certain area where the temperature is taken and/or a condition of operation of such a greenhouse structure.

FIG. 11 represents typical temperature data from a greenhouse, and more particularly illustrates air temperature increases within the greenhouse due to solar energy and the effect of gravel energy storage on temperature conditions within the greenhouse over a period of time. With reference to FIG. 11, it is seen that the inside greenhouse temperature with gravel storage, during the peak daytime hours, generally falls below the peak inside temperature without gravel storage and above the outside temperature over the general time period represented by the graph herein. More particularly, it is seen that the peak temperature of the inside temperature curve with gravel storage is substantially lower than the peak inside temperature without gravel storage. In effect, during daytime where there is an excessive amount of solar energy, the same can be stored within the gravel storage facilities 20 and 24, and thereby effectively cool the greenhouse during the peak daytime hours.

Also, it is seen that the inside temperature with gravel storage for corresponding nighttime periods is greater than the outside temperatures. This is a result of storing energy during the peak daytime periods in the gravel storage facilities 20 and 24, and using that stored energy at night to increase the temperature within the greenhouse.

Thus, it can be stated that with the storage facilities that the inside greenhouse temperature is generally always above the outside temperature and is generally less than the inside greenhouse temperature at peak solar energy daytime periods if the greenhouse was not subjected to some form of cooling. Therefore, it is appreciated that the utilization of solar energy is not only optimized by the provision of the energy storage facilities 20 and 24 in the greenhouse operation, but at the same time, the same energy storage facilities contribute to controlling the environmental conditions within the greenhouse structure to optimize and maximize plant growth.

Hereinbefore a detailed discussion has been presented with respect to controlling the air flow through the structure 10 in various air flow patterns and from this discussion, it can be readily determined the proper manner of handling and controlling the air to store and recapture energy within the gravel storage facilities 20 and 24.

With respect to FIG. 11, it should be noted that the inside temperature without gravel storage and the inside temperature with gravel storage is somewhat lower at a point between the third and fourth days. Since the graph of FIG. 11 is based on actual data taken with respect to a structure of the type disclosed herein, it should be pointed out that these low temperatures were the result of a rainy day. In addition, the time temperature period generally between the fifth and sixth day of the same graph was the result of a cloudy day.

Figure 10:
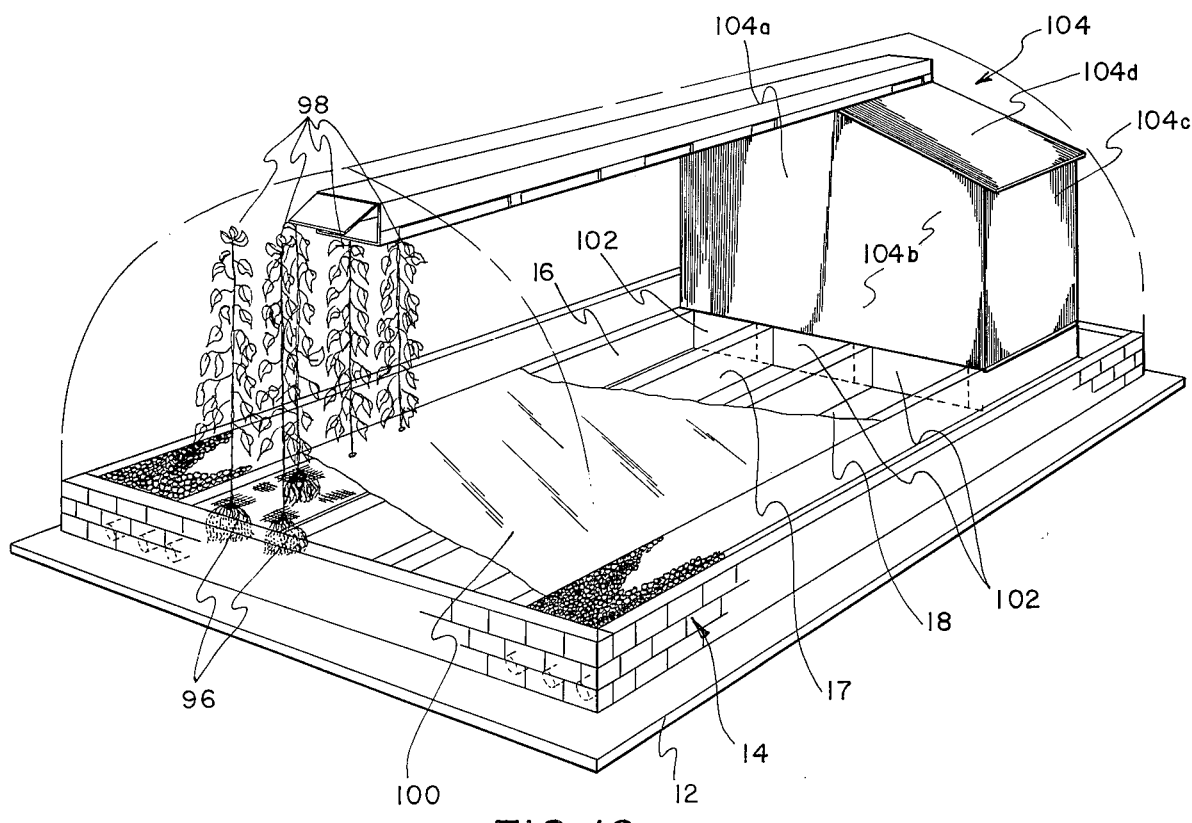
FIG. 10 is a perspective view of the present invention wherein the structure has been converted from a curing and drying facility to a plant growth or horticultural crop growing facility of the hydroponic culture type.

With respect to FIG. 10 and further utility of the present invention, it is seen that the greenhouse solar curing and drying structure 10 has been converted to a plant growth facility of the hydroponic culture type. In such a hydroponic culture growth facility, the plenums 16, 17 and 18 of the former drying structure now become reservoirs for containing a solution principally comprised of water and including plant growth material and/or nutrient as needed for the particular plants or crop material being grown therein.

To contain the water and growth solution, the structure is provided with rear plenum doors 102 that extend transversely across the rear portions of the plenums 16, 17 and 18 so as to confine the water solution within the respective plenums.

Plants 98 (only a few being shown in FIG. 10 for purposes of illustration) are supported within the respective plenums at appropriate spacings by a top screen or wire mesh partition 96 or other appropriate conventional plant support structures that may include such plant support devices such as baskets or the like for containing the root structure of a plant. In some cases, it might be deemed advisable, appropriate, or proper to actually suspend the plant above the root by an appropriate support structure.

To prevent algae and other undesirable growth within the water and plant nutrient solutions within the plenums 16, 17 and 18, in certain cases it may be desirable to provide a black plastic-like material 100 or the like across the plenums just above the water and plant nutrient solution, as shown in FIG. 10.

Details of the hydroponic plant growth culture will not be dealt with herein because such is known today and is actually being practiced commercially. The present invention presents a structure that may be efficiently and effectively utilized for hydroponic growth culture as well as a curing and drying structure or as a conventional greenhouse plant growth structure of the type wherein plants are grown and supported by soil and water is generally provided by a sprinkler system.

But as a matter of basics, it should be pointed out that the converted facility of FIG. 10 should be provided with a fluid pump and associated control system with the pump being communicatively connected to each plenum reservoir 16, 17 and 18 for circulating the water and plant nutrients solution to and from each in order that over a period of time the water and plant nutrient solution in each plenum reservoir will vary from a low level to a high level. At low level, the plant roots should be exposed directly to the surrounding atmosphere in order that the same may receive oxygen from the air, and at high level, the water and plant nutrient solution should surround the plant roots in order that the plants may be properly nourished. Consequently, over a period of time, it is desirable that the level of the water and plant nutrient solution fluctuate back and forth in order that the roots can be properly nourished by the solution, but yet also exposed to the surrounding air in order to receive oxygen.

In addition, the facility shown in FIG. 10 is provided with a fluid receiving heat absorber structure 104 that comprises various top and side panels (such as panels 104a, 104b, 104c, 104d, shown specifically in FIG. 10). Although not particularly shown, each panel of the heat absorber structure 104 includes fluid passage means between the sides thereof and preferably such fluid passage means is in the form of a series of side-by-side channels for receiving portions of the water and plant nutrients solution from the plenum reservoirs. Typically, the temperature of the water and plant nutrient solution in the plenum reservoirs 16, 17, and 18 can be increased during the daytime to a desirable and proper temperature level by pumping the water and plant nutrient solution from the respective reservoirs, through pipes (not shown) to upper portions of the respective water channeling panels of the heat absorber structure 104. Once the water and plant nutrient solution reaches the respective panels of the heat absorber structure 104, the fluid solution thereof is disbursed through the respective panels of the heat absorber where under the influence of gravity the water and plant nutrient solution moves through the respective panels and the solar energy collected by the structure 104 is transferred thereto and consequently the solution is heated to a desirable temperature. By providing control means within the pumping system, the water and plant nutrient solution within the structure can be properly controlled during the daytime. Also, it should be pointed out that where the collected solar energy is greater than the amount needed to maintain a proper temperature, this excessive energy can be stored in a supplemental tank (not shown) and is used at night in conjunction with the gravel storage facilities 20 and 24 already discussed. Moreover, space heating may be gained by recirculating the stored heated water and plant nutrient solution through the heat absorber structure 104 at nighttime or during cloudy periods and in effect transferring the heat from the solution to the heat absorber structure 104 where the same can be transferred to a circulating system of air passing in and around the heat absorber structure 104.

What is claimed is:
1. A solar curing and drying structure adapted to utilize solar energy associated with available solar radiation transmitted into the structure for curing and drying material disposed within said structure, said solar curing and drying structure comprising:
A. an outer structural housing including a substantial area of transparent material for transmitting available solar radiation and the energy associated therewith into said structure;
B. collector means disposed interiorly of said outer structural housing for absorbing solar energy transmitted through said transparent material of said outer structural housing;

C. said collector means defining a drying area inwardly thereof and an open area between said collector means and said outer structural housing;
D. a forced air furnace system associated with said structure for forcing air through said material being cured and dried within said drying area, said forced air furnace system including an air intake area and heating means associated therewith for heating air passing through said furnace system as necessary to maintain an appropriate temperature level within said curing and drying structure;
E. opening means formed within said outer structural housing adjacent the open area between said collector means and said outer housing structure; and
F. means for directing a system of air from outside of said curing and drying structure through said opening means and through a substantial area between said outer structural housing and said collector means where heat associated with collected solar energy may be transferred to said air passing therethrough, said means for directing said system of air further including means for routing said system of air from said open area defined between said collector means and said outer structural housing to the vicinity of said furnace system where said system of air or portions thereof may enter the intake area of said furnace system and be utilized in curing and drying the material within said curing and drying structure.

2. The solar curing and drying structure of claim 1 wherein said means for directing a system of air through said open area between said outer structural housing and said collector means and to the vicinity of said furnace system includes an elongated air transfer duct extending at least substantially the entire length of said drying area and including first opening means formed therein for permitting air to pass from said open area between said outer structural housing and said collector means into said duct, said duct further including an exiting opening means for allowing air passing therethrough to be directed to the vicinity of said forced air furnace system where the air exiting from said duct may enter the intake area of said furnace system.

3. The solar curing and drying structure of claim 2 wherein said duct further includes second opening means formed therein adjacent said drying area and operative when opened to allow air to pass between said drying area and said duct thereby providing for the movement of air through said material being dried in said drying area, through said second opening means within said duct and on through said first opening means to where the air may pass into the open area between said outer structural housing and said collector means, whereby the selective routing of air during drying from said drying area through said duct, and into said open area between said outer structural housing and said collector means during nighttime periods of drying results in a generally dehydration effect in that relatively warm air from said drying area engages the relatively cool inner surface of said outer structural housing causing moisture in the air to condense therefrom.

4. The solar curing and drying structure of claim 1 further including energy storage means for storing quantities of solar energy received during daytime curing and drying periods such that excess quantities of solar energy captured during the daytime curing and drying periods can be stored and utilized at night or other curing and drying periods.

5. The solar curing and drying structure of claim 4 wherein said energy storage means includes, side storage facility means associated with said curing and drying structure; energy storage material disposed within said side storage facility means for collecting heat associated with air passing therethrough and storing the same; air conduit means disposed within said side storage facility means and embedded within said energy storage material for receiving air transferred through said energy storage material and channeling the same therethrough where the exiting air may be directed in an appropriate fashion into the drying area of said curing and drying structure; and fan means operative to pull outside air into said air transfer duct through an outside inlet opening formed therein, on through said open area between said outer structural housing and said collector means where energy in the form of heat may be transferred to the air passing therethrough, and on through said energy storage material and said air conduit means where the exiting air can then be directed into said drying area of said curing and drying structure.

6. The solar curing and drying structure of claim 5 wherein said fan means is operative to work both independently of and in conjunction with said furnace system to provide in efficient flow of air through said curing and drying structure.

7. The solar cutting and drying structure of claim 1 wherein said outer structural housing includes a generally quonset shaped outer fiberglass wall structure disposed outwardly of said collector means; and wherein said means for directing a system of air from outside of said curing and drying structure through said open area between said outer structural housing and said collector means and to the vicinity of said furnace system includes a main air handling duct extending longitudinally between said fiberglass wall structure and said collector means about an upper and generally central location within said curing and drying structure, said main air handling duct including a first set of opening means formed on each side thereof such that when opened air may be readily transferred between said open area between said outer structural housing and said collector means, and wherein said main duct further includes exiting opening means for directing air to said furnace system and to an air intake area associated therewith.

8. The curing and drying structure of claim 7 wherein said first set of opening on each side of said main duct include a series of longitudinally spaced openings, each opening having a closing panel operatively associated therewith and movable between opened and closed positions, and wherein the area of said openings along each side of said main duct progressively increases from the end of said main duct nearest said furnace system towards the opposite end thereof in order to allow for pressure differentials along the duct and to give rise to a generally uniform flow of air over said collector means along at least one side of said curing and drying structure.

9. The curing and drying structure of claim 8 wherein said curing and drying structure includes a furnace room disposed about one end thereof for housing said furnace system; and wherein said air transfer duct includes an exiting end that extends into said furnace room and includes an exiting opening thereabout for allowing air topass between said main duct and said furnace room.

10. A method of utilizing available solar energy to curing and drying crop material within a curing and drying structure having an outer transparent wall structure, a collector means disposed interiorly of said outer transparent wall structure and defining a drying area interiorly, and a forced air furnace system for heating air and forcing the air through the crop material within the drying area during the curing and drying process, the method of curing and drying said crop material comprising:

A. forcing a main system of air into said drying area and through crop material disposed therein;

B. heating said main system of air as necessary to generally maintain an appropriate temperature leveled within said drying area;

C. directing a second system of air into a solar energy collecting area defined between said transparent outer wall structure and said collector means;

D. moving said second system of air generally over a substantial area of said collector means such that heat resulting from solar energy collected thereby is transferred to said second system of air;

E. directing said second sytem of air into an air transfer means; and

F. routing said second system of air through said air transfer means and combining said second system of air with said main system of air such that heat associated with collected solar energy is utilized to supplement heat furnished by said furnace system of said curing and drying structure to efficiently cure and dry crop material disposed within said curing and drying structure.

* * * * *